United States Patent
Breed

(10) Patent No.: US 9,677,893 B2
(45) Date of Patent: Jun. 13, 2017

(54) VEHICULAR NAVIGATION SYSTEM UPDATING BASED ON OBJECT PRESENCE/ABSENCE

(71) Applicant: Intelligent Technologies International, Inc., Miami Beach, FL (US)

(72) Inventor: David S Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 0 days.

(21) Appl. No.: 15/375,102

(22) Filed: Dec. 11, 2016

(65) Prior Publication Data

US 2017/0102242 A1    Apr. 13, 2017

Related U.S. Application Data

(60) Division of application No. 14/886,981, filed on Oct. 19, 2015, now Pat. No. 9,518,830, which is a
(Continued)

(51) Int. Cl.
*G01C 21/30* (2006.01)
*G08G 1/0962* (2006.01)

(52) U.S. Cl.
CPC ........... *G01C 21/30* (2013.01); *G08G 1/0962* (2013.01)

(58) Field of Classification Search
CPC ............................. G01C 21/30; G08G 1/0962
(Continued)

(56) References Cited

U.S. PATENT DOCUMENTS

| 4,081,784 A | 3/1978 | Wilson et al. |
| 4,415,979 A | 11/1983 | Hernandez |

(Continued)

FOREIGN PATENT DOCUMENTS

| CN | 1300032 A | 6/2001 |
| JP | 2006-234480 A | 9/2006 |

(Continued)

OTHER PUBLICATIONS

International Search Report and Written Opinion for PCT/US2016/056960 dated Jan. 19, 2017.
(Continued)

*Primary Examiner* — Brian P Sweeney
(74) *Attorney, Agent, or Firm* — Brian Roffe

(57) ABSTRACT

Processing arrangement for managing temporary updates to a map for use by vehicular navigation systems in vehicles in which a communications system at a remote site receives wireless communications from each vehicle including information about presence of an object or condition at a specific location automatically identified at the specific location without requiring manual entry of data about the object or condition at the specific location and that affects movement of vehicles on a roadway. A processor generates a map update for use by vehicular navigation systems based on the identified object or condition at the specific location which is transmitted to any vehicle in a vicinity of the specific location to cause the vehicular navigation system of that vehicle to use a map with the generated map update to display or otherwise indicate the presence of the object or condition at the specific location.

20 Claims, 6 Drawing Sheets

Related U.S. Application Data continuation-in-part of application No. 14/870,727, filed on Sep. 30, 2015, now abandoned, which is a continuation-in-part of application No. 13/714,880, filed on Dec. 14, 2012, now Pat. No. 9,154,893.

(60) Provisional application No. 61/580,710, filed on Dec. 28, 2011.

(58) Field of Classification Search
USPC .......................................................... 701/532
See application file for complete search history.

(56) References Cited

U.S. PATENT DOCUMENTS

| | | |
|---|---|---|
| 4,840,377 A | 6/1989 | Bowser et al. |
| 4,845,464 A | 7/1989 | Drori et al. |
| 4,893,924 A | 1/1990 | Leonard et al. |
| 5,194,847 A | 3/1993 | Taylor et al. |
| 5,353,009 A | 10/1994 | Marsh et al. |
| 5,386,368 A | 1/1995 | Knight |
| 5,532,679 A | 7/1996 | Baxter, Jr. |
| 5,677,666 A | 10/1997 | Stallbohm |
| 5,801,943 A | 9/1998 | Nasburg |
| 5,864,305 A | 1/1999 | Rosenquist |
| 5,939,987 A | 8/1999 | Cram |
| 5,963,148 A | 10/1999 | Sekine et al. |
| 5,969,608 A | 10/1999 | Sojdehei et al. |
| 6,097,313 A | 8/2000 | Takahashi et al. |
| 6,154,131 A | 11/2000 | Jones, II et al. |
| 6,229,438 B1 | 5/2001 | Kutlucinar et al. |
| 6,281,806 B1 | 8/2001 | Smith et al. |
| 6,288,973 B1 | 9/2001 | Joynes |
| 6,385,132 B1 | 5/2002 | Sackett |
| 6,510,381 B2 | 1/2003 | Grounds et al. |
| 6,577,943 B2 | 6/2003 | Nakao et al. |
| 6,611,755 B1 | 8/2003 | Coffee et al. |
| 6,633,808 B1 | 10/2003 | Schulz et al. |
| 6,731,204 B2 | 5/2004 | Lehmann |
| 6,760,661 B2 | 7/2004 | Klein et al. |
| 6,801,837 B2 | 10/2004 | Carlstedt et al. |
| 6,919,803 B2 | 7/2005 | Breed |
| 6,978,206 B1 | 12/2005 | Pu et al. |
| 6,980,483 B2 | 12/2005 | McDonald |
| 7,002,481 B1 | 2/2006 | Crane et al. |
| 7,161,497 B2 | 1/2007 | Gueziec |
| 7,245,559 B2 | 7/2007 | McDonald et al. |
| 7,290,451 B2 | 11/2007 | Taniguchi et al. |
| 7,304,589 B2 | 12/2007 | Kagawa |
| RE40,073 E | 2/2008 | Breed |
| 7,663,502 B2 | 2/2010 | Breed |
| 7,688,228 B2 | 3/2010 | Tanizaki et al. |
| 7,689,230 B2 | 3/2010 | Spadafora et al. |
| 7,711,699 B2 | 5/2010 | Koromyslov et al. |
| 7,747,710 B1 | 6/2010 | Osburn, III et al. |
| 7,778,770 B2 | 8/2010 | Sakagami et al. |
| 7,840,355 B2 | 11/2010 | Breed et al. |
| 7,865,304 B2 | 1/2011 | Gretton et al. |
| 7,961,094 B2 | 6/2011 | Breed |
| 8,014,789 B2 | 9/2011 | Breed |
| 8,024,084 B2 | 9/2011 | Breed |
| 8,035,508 B2 | 10/2011 | Breed |
| 8,214,219 B2 | 7/2012 | Prieto et al. |
| 8,219,110 B1 | 7/2012 | White et al. |
| 8,242,621 B1 | 8/2012 | Tate et al. |
| 8,284,041 B2 | 10/2012 | Cuddihy et al. |
| 8,552,838 B2 | 10/2013 | Addy |
| 8,581,688 B2 | 11/2013 | Breed |
| 8,635,013 B2 | 1/2014 | Zuccotti et al. |
| 8,653,967 B1 | 2/2014 | Vosburgh |
| 8,660,787 B2 | 2/2014 | Minami |
| 8,710,983 B2 | 4/2014 | Malkowski |
| 8,718,910 B2 | 5/2014 | Gueziec |
| 8,786,464 B2 | 7/2014 | Gueziec |
| 8,825,374 B2 | 9/2014 | Dimitriadis |
| 8,830,085 B2 | 9/2014 | Edwardson et al. |
| 8,886,599 B2 | 11/2014 | Wellman |
| 8,958,988 B2 | 2/2015 | Gueziec |
| 9,000,918 B1 | 4/2015 | McLaughlin et al. |
| 9,074,902 B2 | 7/2015 | Nagasaka et al. |
| 9,082,303 B2 | 7/2015 | Gueziec |
| 9,084,190 B2 | 7/2015 | Noh et al. |
| 9,091,554 B2 | 7/2015 | Neumann et al. |
| 9,097,543 B2 | 8/2015 | Kato et al. |
| 9,127,954 B2 | 9/2015 | Kutomi |
| 9,141,372 B1 | 9/2015 | Sarkar et al. |
| 9,142,147 B2 | 9/2015 | Koshiba |
| 9,154,893 B1 | 10/2015 | Breed |
| 9,159,231 B2 | 10/2015 | Noh |
| 9,176,924 B2 | 11/2015 | Ricci |
| 9,285,229 B2 | 3/2016 | Kunath et al. |
| 9,378,222 B2 | 6/2016 | Luedtke et al. |
| 9,383,213 B2 | 7/2016 | Rieth et al. |
| 2001/0014849 A1 | 8/2001 | King et al. |
| 2001/0040508 A1 | 11/2001 | Janning et al. |
| 2004/0034467 A1 | 2/2004 | Sampedro et al. |
| 2004/0056779 A1 | 3/2004 | Rast |
| 2004/0220727 A1 | 11/2004 | Adachi |
| 2005/0222764 A1 | 10/2005 | Uyeki et al. |
| 2006/0167595 A1 | 7/2006 | Breed et al. |
| 2006/0181413 A1 | 8/2006 | Mostov |
| 2007/0179681 A1 | 8/2007 | Shaffer et al. |
| 2007/0185645 A1 | 8/2007 | Chao et al. |
| 2007/0197239 A1 | 8/2007 | Sane |
| 2007/0205893 A1 | 9/2007 | Mainini et al. |
| 2007/0222663 A1 | 9/2007 | Humphrey et al. |
| 2008/0088480 A1 | 4/2008 | Rozum et al. |
| 2008/0094250 A1 | 4/2008 | Myr |
| 2008/0195261 A1 | 8/2008 | Breed |
| 2009/0033540 A1 | 2/2009 | Breed et al. |
| 2009/0058593 A1 | 3/2009 | Breed |
| 2009/0201190 A1 | 8/2009 | Huthoefer et al. |
| 2009/0248286 A1 | 10/2009 | Nagase et al. |
| 2009/0252196 A1 | 10/2009 | Icove et al. |
| 2010/0057333 A1 | 3/2010 | Yun |
| 2010/0121565 A1 | 5/2010 | Uyeki et al. |
| 2010/0324810 A1 | 12/2010 | Uyeki et al. |
| 2011/0046872 A1 | 2/2011 | Uyeki et al. |
| 2011/0089696 A1 | 4/2011 | Davis et al. |
| 2011/0098915 A1 | 4/2011 | Disatnik et al. |
| 2011/0102193 A1* | 5/2011 | Stahlin ............ G08G 1/096791 340/905 |
| 2011/0144930 A1 | 6/2011 | Bruno et al. |
| 2011/0160989 A1 | 6/2011 | Uyeki et al. |
| 2011/0227733 A1 | 9/2011 | Kelly et al. |
| 2011/0264371 A1 | 10/2011 | Uyeki |
| 2012/0248865 A1 | 10/2012 | Eder et al. |
| 2013/0222154 A1 | 8/2013 | Mori et al. |
| 2013/0329052 A1 | 12/2013 | Chew |
| 2014/0160290 A1 | 6/2014 | Wu |
| 2014/0236464 A1 | 8/2014 | Gueziec |
| 2014/0350830 A1 | 11/2014 | David |
| 2015/0179062 A1 | 6/2015 | Ralston et al. |
| 2016/0046237 A1 | 2/2016 | Sugimoto et al. |
| 2016/0091328 A1 | 3/2016 | Ould-Ahmen-Vall et al. |
| 2016/0169702 A1 | 6/2016 | Kim |
| 2016/0189545 A1 | 6/2016 | York et al. |

FOREIGN PATENT DOCUMENTS

| | | |
|---|---|---|
| MR | 101292833 B1 | 8/2013 |
| RO | 127555 A2 | 6/2012 |

OTHER PUBLICATIONS

Abstract of KR 101292833.
Abstract of CN 1300032.
Abstract of RO 127555.

* cited by examiner

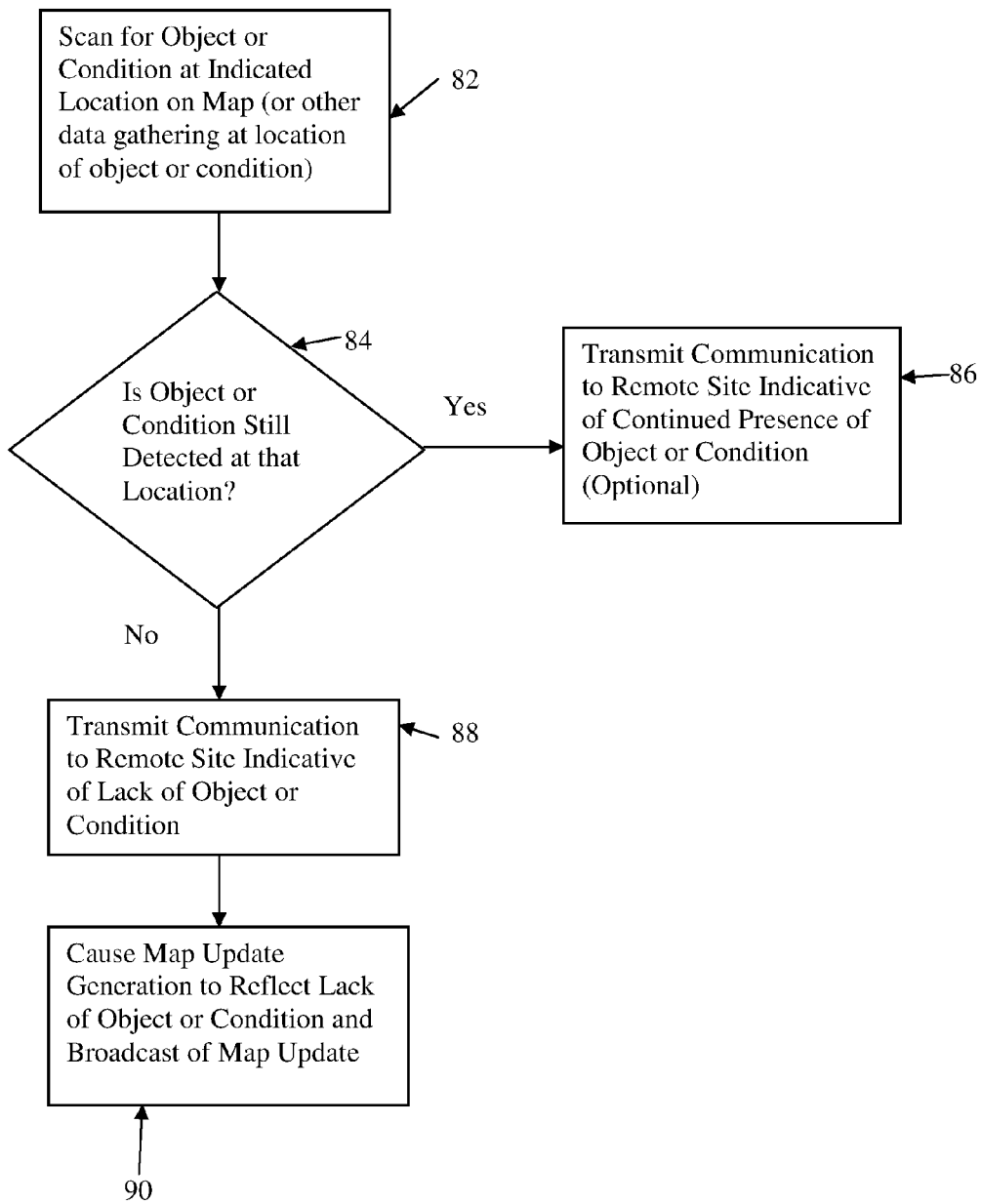

VEHICULAR NAVIGATION SYSTEM UPDATING BASED ON OBJECT PRESENCE/ABSENCE

CROSS REFERENCE TO RELATED APPLICATIONS

This application is a divisional of U.S. patent application Ser. No. 14/886,981 filed Oct. 19, 2015 which is a continuation-in-part of U.S. patent application Ser. No. 14/870,727 filed Sep. 30, 2015, now abandoned, which is a continuation-in-part of U.S. patent application Ser. No. 13/714,880 filed Dec. 14, 2012, now U.S. Pat. No. 9,154,893, which claims priority under 35 U.S.C. §119(e) of U.S. provisional patent application Ser. No. 61/580,710 filed Dec. 28, 2011, all of which are incorporated by reference herein.

FIELD OF THE INVENTION

The present invention relates generally to techniques for temporarily placing on a map being displayed by a vehicular navigation system, the existence of a potentially dangerous movable object in the path of travel of the vehicle, such as an animal, disabled car, ice, boulder, etc. In one embodiment, the presence of object is detected by recognizing sounds or vibrations, and more specifically recognizing sounds in an environment in and around, or generally related to, a vehicle or a road on which a vehicle travels. The object is removed when it is no longer present/

BACKGROUND OF THE INVENTION

In U.S. patents by the inventor, various applications of sound-recognition techniques for use on or by a vehicle are disclosed.

For example, U.S. Pat. No. 7,663,502 discloses an occupant sensor that determines the presence and health state of any occupants in the vehicle by analyzing sounds emanating from the passenger compartment. Such sounds, or an interpretation or derivative thereof, can be directed, e.g., using telematics, to a remote, manned site for consideration in dispatching response personnel.

In one embodiment, presence determining means, health state determining means and location determining means obtain readings from the passenger compartment and direct such readings to a processor. The processor analyzes the information and directs or controls the transmission of the information about the occupant(s) to a remote, manned facility. Such information could include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds (as detected by a microphone). The communications link through a communications unit can be activated immediately after the crash to enable personnel at the remote facility to initiate communications with the vehicle.

U.S. Pat. No. 6,919,803 (reissued as U.S. RE 40073) discloses a method for monitoring movable assets and inanimate contents in the assets in which a replaceable cell phone or PDA having a location providing function and a low duty cycle is mounted on the asset, the location of the asset is determined, and information about the inanimate contents of the asset other than the location of the asset is also determined. The information determining step comprises arranging at least one wave receiver on the asset in a position to receive waves from the interior of the asset and comparing waves received by the at least one wave receiver at different times such that the information about the inanimate contents of the asset are obtained based on the comparison of the waves received by the at least one wave receiver at different times. Communications between the cell phone or PDA and the asset enable the cell phone or PDA to obtain the determined location of the asset and the determined information about the inanimate contents of the asset. A communications channel is established between the cell phone or PDA and a location remote from the asset to enable the information about the asset and its inanimate contents to be transmitted to the remote location. When a cell phone is mounted to the asset, the cell phone has a sound-receiving component, in which case, a pattern recognition system may be provided in the cell phone to recognize events relating to the asset based on sounds received by the sound-receiving component.

U.S. Pat. No. 8,014,789 discloses a method of determining a location of a cell phone or PDA at a location apart from the cell phone or PDA by obtaining information at the cell phone or PDA relating to reception of signals by the cell phone or PDA, transmitting the obtained information from the cell phone or PDA to a remote facility situated separate and apart from the cell phone or PDA, monitoring received sounds at the cell phone or PDA via a microphone of the cell phone or PDA, and programming the cell phone or PDA to analyze the received sounds. This latter step may entail training the cell phone or PDA to recognize the sounds of accidents involving a vehicle. Then, an accident indication signal may be transmitted to the remote facility when a sound of an accident involving the vehicle is recognized from the monitored received sounds. At the remote facility, the location of the cell phone or PDA is determined from the information transmitted from the cell phone or PDA when the accident indication signal is received.

U.S. Pat. No. 8,035,508 discloses a method for obtaining information about a person when in a vehicle or the vehicle, comprising providing the person with a portable device, arranging at least one sensor on the portable device, the at least one sensor including a microphone, and receiving information from the at least one sensor of the portable device when the portable device is situated in the vehicle. Information may be received from the at least one sensor by receiving sounds via the microphone of the portable device. Further, information about the person, the vehicle or an environment around the person is obtained using the at least one sensor of the portable device without manual interaction, e.g., by, inter alia, programming the portable device to analyze the information received from the at least one sensor to determine whether the information is indicative of an accident involving the vehicle. Programming the portable device to analyze the information may entail programming the portable device to analyze the received sounds via the microphone of the portable device. A signal based on the analysis of the received information from the at least one sensor of the portable device when situated in the vehicle may be transmitted to a remote facility including a signal based on the determination of whether the information is indicative of an accident involving the vehicle. The transmission of the signal based on the analysis of the received information entails transmitting to the remote facility, a signal indicative of the received sounds including the sound of an accident involving the vehicle or the sound of deployment of an airbag of the vehicle that would deploy to protect an occupant of the vehicle during an accident involving the vehicle. In some embodiments, the portable device is trained to recognize the sounds of accidents, for example, using pattern recognition techniques, such that the signal indicative of the receiving sounds being transmitted to the remote facility is an accident indication signal when the sound of an accident is recognized. Additionally or alternatively, the portable device may be trained to recognize the sounds of deployment of an airbag of the vehicle such that the signal indicative of the receiving sounds being transmitted to the remote facility is an airbag deployment signal when the sound of an airbag deployment is recognized.

All of these patents, along with U.S. Pat. No. 8,024,084, are incorporated by reference herein.

OBJECTS AND SUMMARY OF THE INVENTION

It is an object of the present invention to provide systems and methods that temporarily place on a map being displayed by a vehicular navigation system, the existence of a potentially dangerous movable object in the path of travel of the vehicle, such as an animal, disabled car, black ice, boulder etc.

Accordingly, a vehicular navigation system updating system in accordance with the invention includes at least one condition detector that automatically detects presence of an object or condition at a specific location and that affects movement of vehicles on a roadway without requiring manual entry of data about the object or condition. The condition detector may be configured to detect only objects, such as only objects incapable of moving by themselves (boulders, disabled cars, etc.), or only non-vehicular movable objects (animals, such as deer, bear, elk, moose, and other relatively large animals that can cause injury to vehicular occupants if impacting a vehicle), or both. The condition detector may be configured to exclude detection of one or more specific conditions such as traffic.

The updating system also includes a first communications system coupled to the condition detector and that transmits a signal, data or information about the detected presence of the object or condition at the specific location, a second communications system that wirelessly receives transmission of the signal, data or information about the detected presence of the object or condition from the first communications system, and a processor coupled to the second communications system and situated at a site remote from the condition detector and that is configured to generate an update for a map provided by vehicular navigation systems based on the detected presence of the object or condition and direct communication of the map update to at least one vehicle in a vicinity of the specific location at which the condition detector detected the presence of the object or condition. The vehicular navigation system of each vehicle uses the map with the map update to display or otherwise indicate the presence of the object or condition, e.g., on a heads-up display (HUD) visible to the driver of the vehicle.

Each condition detector may be situated on a vehicle, fixed on infrastructure on or alongside the roadway, permanently fixed to a vehicle, or removably coupled to a vehicle, and be independently operable when separated and removed from the vehicle, or any other vehicle. The condition detector may be configured to receive sounds or vibrations from an environment in or around the vehicle. As used herein, the term "sounds" includes, but is not limited to sirens, alarms, buzzers, sound of collisions, sounds of distress such as human screams and animal cries, and the like. The first communications system may be co-located with the condition detector on a vehicle or on infrastructure on or alongside the roadway, e.g., on a pole or gantry.

In one embodiment, the map modification is temporary and an assessment system determines whether the object or condition whose presence was detected by the condition detector at the specific location is still present at that location or is absent from the specific location. The assessment system may be the same condition detector that detected the object or presence, or another condition detector. The assessment system is configured to cause, when it determines that the object or condition whose presence was detected by the condition detector at the specific location is absent at that location, transmission of a signal, data or information about detected absence of the object or condition at the specific location. The processor at the remote site is then configured to generate another update for the map based on the detected absence of the object or condition and direct communication of the map update to at least one vehicle, with the vehicular navigation system of each receiving vehicle using the map with the another update to remove the presence of the object or condition at the specific location. The assessment system may be coupled to the first communications system and the signal, data or information about the detected absence of the object or condition at the location transmitted by the first communications system to the second communications system.

The map update may be an audio file that is configured to be verbalized by the vehicular navigation system when a location of the vehicle approaches the specific location at which the condition detector detected the presence of the object or condition. It may additionally or alternatively be an image file that is configured to be displayed on a display of the vehicular navigation system at the specific location at which the condition detector detected the presence of the object or condition.

A method for automatically conveying information about a condition in accordance with the invention includes identifying presence of an object or condition at a specific location and that affects movement of vehicles on a roadway using at least one condition detector located on or alongside the roadway without requiring manual entry of data about the object or condition. When the presence of an object or condition is identified, the method includes transmitting a signal indicative of the object or condition at the specific location to a remote site using a first communications system, generating, using a processor at the remote site, an update for a map provided by vehicular navigation systems based on the identified object or condition, and transmitting, using a second communications system, the map update to at least one vehicle in a vicinity of the specific location at which the condition detector detected the presence of the object or condition to cause a vehicular navigation system of the at least one vehicle to use a map with the map update to display or otherwise indicate the presence of the object or condition at the specific location.

Each condition detector may be arranged at a fixed location on or alongside the roadway such that the condition detector detects objects or conditions on or alongside the roadway. In this case, the map update is transmitted to at least one vehicle by directing a vehicle-targeted map update from the remote site to vehicles travelling on the roadway based on the location of the condition detector at which the presence of the object or condition is detected. Presence of an object or condition that affects movement of vehicles on the roadway may entail analyzing sounds received by the condition detector to identify animals on or alongside the roadway. To effect removal of the object or condition from the updated map, without relying on a time-based removal, the method entails determining whether the object or condition whose presence was detected by the condition detector at the specific location is still present at that location or is absent at the specific location. If the object or condition whose presence was detected by the condition detector at the specific location is absent at the specific location, the method includes transmitting a signal, data or information about the detected absence of the object or condition at the specific location to the remote site, generating, using the processor at the remote site, another update for the map based on the detected absence of the object or condition at the specific location, and directing communication of the map update to at least one vehicle so that the vehicular navigation system of this one vehicle uses the map with the another update to remove the presence of the object or condition at the specific location.

A multi-vehicle method for causing temporary updates to a map for use by a vehicular navigation system in each vehicle in accordance with the invention includes identifying presence of an object or condition at a specific location and that affects movement of vehicles on a roadway using at least one condition detector located on at least one of the vehicles or infrastructure without requiring manual entry of data about the object or condition. When the presence of an object or condition is identified by the condition detector, the identified presence of the object or condition is communicated to a remote site using a first communications system coupled to the condition detector and using a processor at the remote site, an update for a map for use by the vehicular navigation systems is generated based on the identified object or condition. Using a second communications system associated with the remote site, the map update is transmitted to any vehicle in a vicinity of the specific location at which the condition detector detected the presence of the object or condition to cause the vehicular navigation system of that vehicle to use a map with the map update to display or otherwise indicate the presence of the object or condition at the specific location. Also, to avoid permanent display of only a temporary object or condition at the specific location, a determination is made as to whether the object or condition whose presence was detected by the condition detector at the specific location is still present at that location or is absent at the specific location at a subsequent time after generation of the map update relating to the presence of that object or condition. This determination may be made by an assessment system in any of the vehicles passing by that location or infrastructure capable of obtaining information about that location, and which may be the same as the condition detector. When the assessment system determines that the object or condition is absent at the specific location, the absence of the object or condition at the specific location is communicated to the remote site using a third communications system (which may be the same as the first communications system if the assessment system is the condition detector), and using the processor at the remote site, another update for the map is generated for use by the vehicular navigation systems based on the absence of the object or condition at the specific location. The method then entails transmitting, using the second communications system associated with the remote site, the another update to vehicles in that vicinity to cause the vehicular navigation system of the vehicles to use a map with the another map update to avoid display or indication of the presence of the object or condition at the specific location.

BRIEF DESCRIPTION OF THE DRAWINGS

The following drawing is illustrative of an embodiment of a system developed or adapted using the teachings of at least one of the inventions disclosed herein and is not meant to limit the scope of the invention as will be eventually encompassed by the claims.

FIG. 6 is a flowchart of the manner in which a processor can execute a software program to assess the presence of a previously reported object or condition that caused a map update to be sent to the vehicular navigation system and a corresponding icon or other indicia to be displayed or otherwise indicated to the operator of the vehicle.

DETAILED DESCRIPTION OF THE INVENTION

Figure 1:
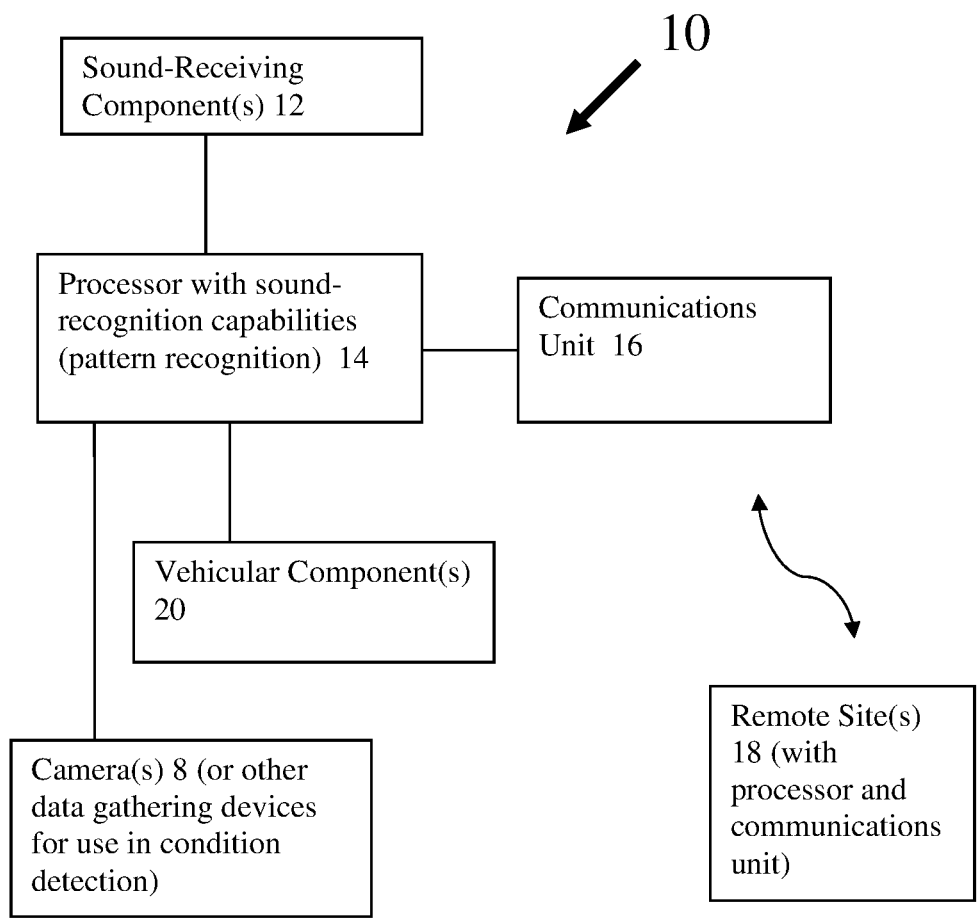
FIG. 1 is a schematic of a system in accordance with the invention that utilizes techniques for recognizing sounds in an environment in and around a vehicle.

Referring to the accompanying drawings wherein like reference numerals refer to the same or similar elements, FIG. 1 shows a system in accordance with the invention that is designated generally as 10 and includes one or more sound-receiving/vibration-detecting components 12, e.g., one or more microphones, that are each mounted or otherwise arranged in or on a vehicle, and a processor 14 coupled to the sound-receiving/vibration-detecting components 12. Processor 14 preferably includes a pattern recognition system, or another type of system that is capable of analyzing received sounds and/or detected vibrations to determine desired information, described more fully below. Processor 14 may embody the pattern recognition system on computer media, e.g., as a software program stored and executed in a conventional manner.

A communications device 16 is coupled to the processor 14 and transmits signals, data or information about analysis of the sounds received by the sound-receiving/vibration-detecting components 12 that is performed by the processor 14, or vibrations detected thereby. The communications device 16 transmits the signals, data and/or information to one or more remote sites 18 separate and apart from the vehicle, i.e., these sites not being located on the vehicle. This transmission may occur as the vehicle is travelling and moving along a road, although transmission while the vehicle is stationary also possible. The same signals, data and/or information may also be provided to one or more components 20 on the vehicle for their use, e.g., to undertake an action responsive to the detection and recognition of a particular sound or group of sounds, or vibration or group of vibrations.

The processor 14 may be configured to use pattern recognition (e.g., neural networks) to identify sounds relating to collisions, noises from injured people, vehicle diagnostics, etc., as well as to identify objects and conditions relating to vibrations More generally, pattern recognition may be used to identify the presence of one of a predetermined number of alarm-generating conditions that can be detected by analysis of sound and/or vibrations. Such conditions are any conditions for which the sound-monitoring system is used to detect their presence.

The sound-receiving/vibration-detecting component 12 may be part of a cellular telephone, smartphone or PDA, see U.S. Pat. No. 8,014,789 mentioned above, or more generally any hand-held device. The hand-held device may be independently usable as a communications device outside of the vehicle, and removably or detachably coupled to the vehicle for use in combination with the vehicle-resident processor and/or vehicle-resident communications device.

Alternatively, the system 10 may be implemented entirely on a hand-held device, such as a cellular telephone, smartphone or PDA, with the sound-receiving/vibration-detecting component 12, processor 14 and communications device 16 all being part of this hand-held device. The system would operate when the hand-held device is situated in a vehicle, and would be trained to recognize sounds or vibrations particular to a vehicle, e.g., a crash or collision involving the vehicle, airbag deployment, and the like. In this case, system 10 would be useable when detached and outside of all vehicles.

Communications device 16, in any configuration, may be configured to generate and send a message to the remote site 18 relating to and/or uniquely responsive to the detected and recognized sounds or vibrations. A message might include terms like "airbag deployment", "front impact crash", and the like. Conventional message protocol may be used, as known to those skilled in the communications art.

A processor 14 may be configured to use modular neural networks (combination neural nets) would be most applicable. A first neural network could segment the noise into various initial categories followed by a more complete classification at another layer, or another neural network.

In addition to microphones, the sound-receiving/vibration-detecting components 12 may include sensors or apparatus that record vibrations such as accelerometers, all of which are coupled to the processor 14.

The detected sounds and/or vibrations may be run through a Fast Fourier Transform (FFT), through hardware and/or software resident with the sound-receiving/vibration-detecting component 12 and/or at the processor 14. Other pre-processing of the detected sounds and/or vibrations prior to application to a sound/vibration-recognition technique may also be used in accordance with the invention.

Additional material that may be used in the invention includes that disclosed in U.S. patent application Ser. No. 11/923,929, U.S. Pat. Appln. Publ. No. 2008/0195261), all of which is incorporated by reference herein. For example, the '929 application discloses a sound sensor to sense and recognize sound associated with the deployment or of a crash, transmission of a signal of the crash, a neural network or other pattern recognition system used in the sound recognition process, a neural network to recognize a person, as well as a combination neural network, detecting whether a person is making a sound, e.g., crying, and a Fourier transfer used with optics and implied that it can be used with ultrasonics.

The processor 14 is configured so that it can detect and identify non-speech sounds, e.g., sounds of a crash or airbag deployment. Additional non-speech sounds include sirens, alarms, buzzers, sound of collisions, sounds of distress such as human screams and animal cries, etc. The system 10 may be used in an environment which both speech sounds and multiple non-speech sounds are detected. The processor 14 is preferably designed to process the sounds and vibrations in real-time, i.e., have a high processing time. The size of the system, including microphone or other sound-receiving components/vibration-detecting 12 and processor 14, will be small so that it preferably can be carried by a person and thus would be operative when the person is in the vehicle. The processor 14 may also include technology to separate such non-speech sounds from speech sounds and to identify types of the sounds.

System 10 is explained with reference to a vehicle-mounted application. However, a similar system may be used in a non-vehicular mounted application in which recognition of additional sounds and vibrations is desired.

Figure 2:
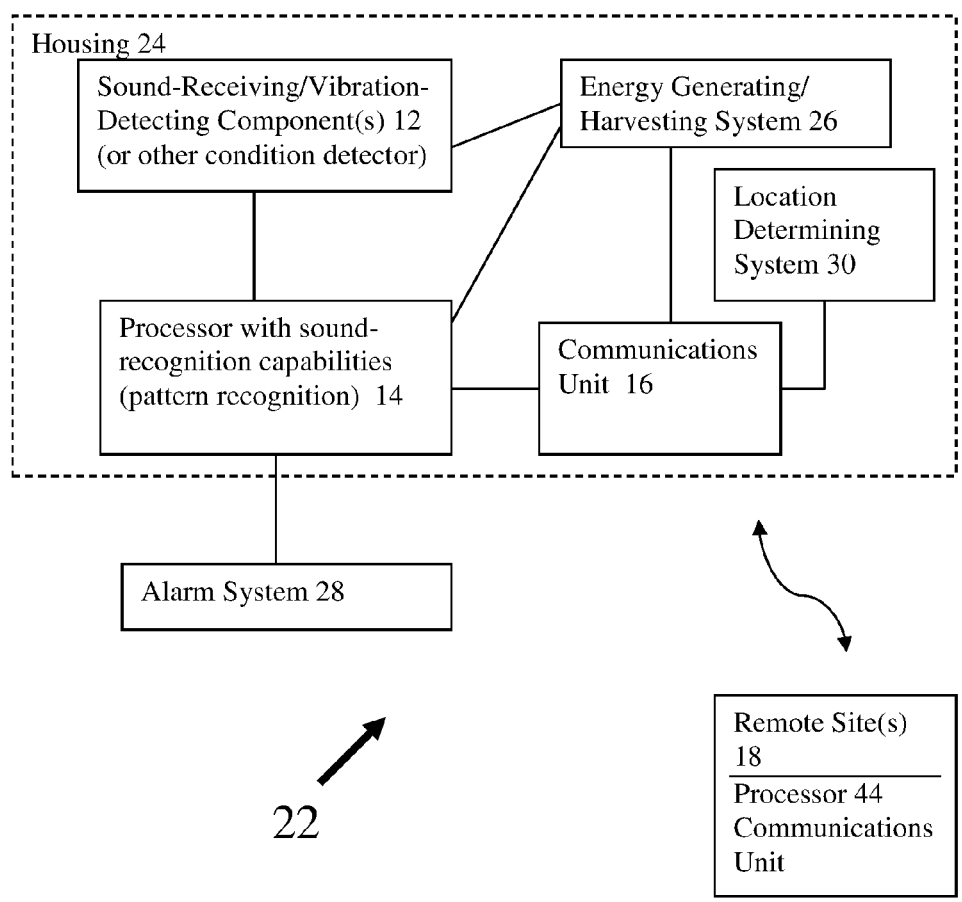
FIG. 2 is a schematic of a system in accordance with the invention that utilizes techniques for recognizing sounds in a non-vehicular mounted environment.

Referring now to FIG. 2, a system 22 includes one or more sound-receiving/vibration-detecting components 12, a processor 14 and a communications device 16 as described above, all of which are preferably arranged in a self-contained housing 24. In this embodiment, the communications device 16 is optional and when present, transmits the signals, data and/or information to one or more remote sites 18 separate and apart from the housing 24, i.e., these sites not being located on the housing. This transmission may occur periodically at set time intervals, based on conditions detected around the housing, based on the frequency at which conditions are detected, and at variable frequencies depending on changes in the monitoring environment.

Housing 24 is placed, installed, mounted or otherwise arranged at the location at which sound/vibration-monitoring is desired. For example, the housing 24 may be placed near a roadway to sense the presence of deer or other animals proximate or on the roadway. To this end, the processor 14 may be configured to use pattern recognition (e.g., neural nets) to identify sounds or vibrations relating to objects passing near the roadway, such as people, deer or other animals. A system as described in U.S. patent application Ser. No. 12/325,719 filed Dec. 1, 2008 and Ser. No. 13/686,862 filed Nov. 27, 2013 may be used to detect the presence of objects alongside or in the roadway, and both applications are incorporated by reference herein.

System 22 also preferably includes an energy generating/harvesting system 26, such as a solar collector, that generates energy needed by the other components of the system 22 to which it is connected, i.e., the sound-receiving/vibration-detecting components 12, processor 14 and optional communications device 16. By providing the energy generating/harvesting system in connection with the housing 24, the need to connect the housing 24 and components therein to a remote source of electricity via wires is eliminated.

Information obtained by the sound-monitoring system 22 can be used to alert approaching drivers of vehicles on the monitored roadway by means of an alarm system 28 coupled to the processor 14. Alarm system 28 may be separate from and attached to the housing 24, or integrated into or within the housing 24. Alarm system 28 may be configured to provide a visual alarm, such as by a flashing light, and/or an audible alarm such as by emitting a sound. Alarm system 28, when providing a visual alarm, is positioned to be visible to the intended recipients.

Additionally or alternatively, communications device 16 may be used as an alarm system to generate an electronic alarm by sending a radio frequency signal which can be received by approaching vehicles or which can be used by a processor 44 at a remote site 18 to place a message on a map which would be transmitted to the vehicles in the area. The message may be broadcast to only certain areas and the control criteria for determining which area to broadcast which messages may be performed at the remote site 18 by a processor. It would then direct certain map updates to specific transmitters or broadcast equipment and other messages to different transmitters and broadcast equipment.

More specifically, this processor 44 at the remote site may determine a map update that will cause a navigation system on a vehicle to indicate the message to vehicles that may be impacted by the message based for example, on their location, their velocity, their destination, etc. The indication of the message may be displayed on a screen of the navigation system and/or an oral notification. The map update is transmitted (broadcast) and vehicles process it in a manner they would typically process map updates.

The radio frequency signal is derived from the identification of the sounds and/or vibrations as being one of a predetermined number of conditions being monitored by the monitoring system 22.

Figure 3:
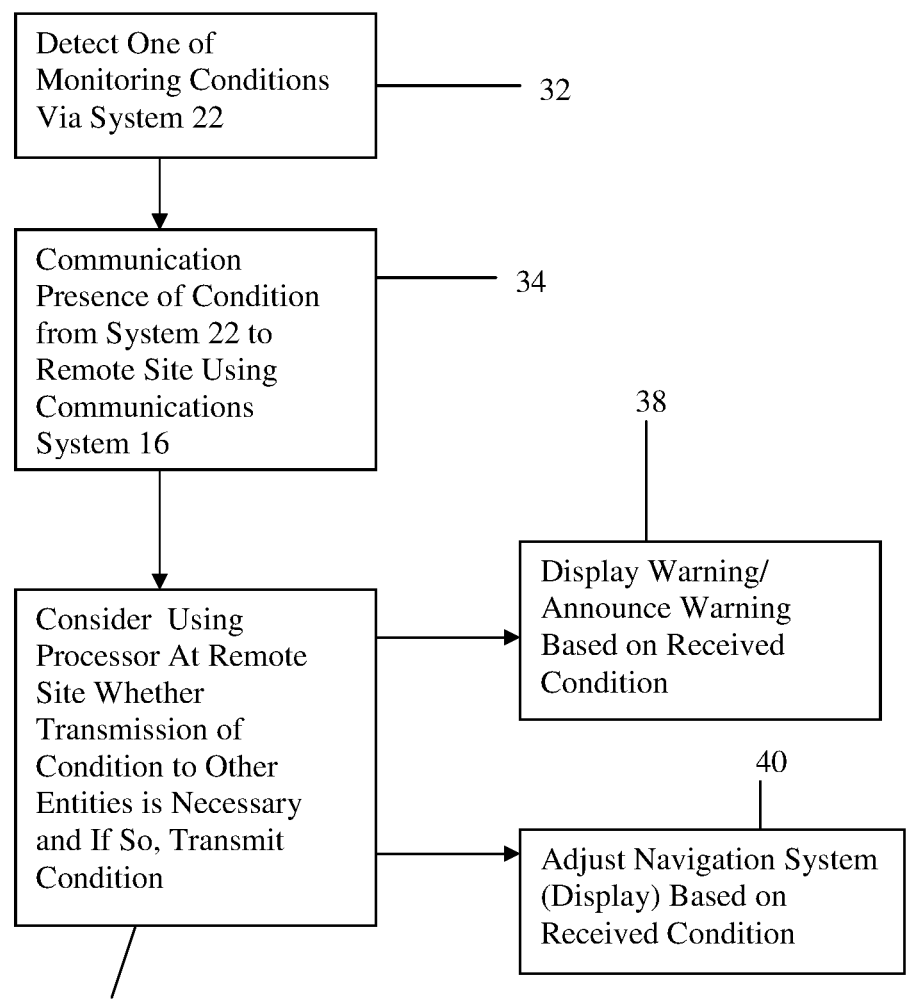
FIG. 3 is a flow chart showing one manner in which an alarm-generating condition is detected by a system in accordance with the invention and communicated to interested parties.

Referring in this regard to FIG. 3, in step 32, one of monitoring conditions is detected via system 22, and in step 34, the presence of the condition is transmitted from system 22 to the remote site 18 using communications system 16. At the remote site 18, the processor 44 considers whether transmission of the condition to other entities is necessary and if so, directs a transmission system or communications network to transmit the condition, in step 36. Upon receipt of the transmission from the remote site 18, a warning may be caused to be displayed, e.g., on a sign next to the road along which the condition was detected (step 38), and ideally in advance of the location at which the condition was detected in the direction of travel along the road. The location at which the condition is detected may be provided in the transmission relating to the condition from the communications system 16, whether the housing 24 is fixed at a location and the location initially provided to the remote site, or whether the housing 24 includes a location determining system 30 that determines its location and enables the location to be included in the outgoing transmissions.

Additionally or alternatively, the transmission is made in a protocol of a navigation system on a vehicle and it causes the navigation system to be adjusted to display the condition when the location at which the condition was detected is shown on the navigation system display.

In the latter situation, the processor 44 at the remote site 18 would convert the radio frequency signal from the communications device 16 into an indication to be added to a map of the road, and send the map addition wirelessly to vehicles in the vicinity of the road (see the description of FIG. 4 below). For example, commands from the remote site 18, generated by the processor 44 thereat, may be designed to cause an on-board vehicle processor that controls a navigation system to generate an icon on the display of the navigation system representing deer if the system 22 determines the presence of deer near the roadway. A driver is thus forewarned of deer prior to approaching the section of the road near where deer were detected by system 22, thereby potentially preventing an accident between the vehicle and deer.

This processor at the remote site 18 may thus determine a map update that will cause the on-board navigation system to indicate the location of the icon. The map update is transmitted (broadcast) and vehicles process it in a manner they would typically process map updates.

Communications device 16, in any configuration, may be configured to generate and send a message to the remote site 18 relating to or uniquely responsive to the detected and recognized sounds. A message might include terms like "deer near roadway", and the like. This may be supplemental to the actions undertaken by the alarm system 28 upon command from the processor 14.

System 22 shown in FIG. 2 is not only applicable for use alongside a road but also in marine or maritime applications. For example, housing 24 may be placed on a buoy in the ocean where it would listen for submarines or ships and report their presence. In this case, the energy generating/harvesting system 26 may be one based on wave motion. The buoy is fixed at a location sought to be monitored, and remains fixed at this location, i.e., even though it moves with waves, this wave-based movement does not change its fixing at the location.

System 22 is also applicable on national borders or on the perimeters of sensitive areas to detect footprints or other sounds which could the emitted by people attempting to cross the border or penetrate into a secure area. One application for this would be for detecting people attempting to enter secured areas around airports. Again, energy harvesting, probably solar, could be used to essentially permit an infinite life for the device.

In another variant, system 10 or 22 may be modified to include a GPS chip to indicate the location of the system and thus of the sound or vibration. Embodied as a location determining system 30 in FIG. 2, this embodiment would be most helpful when the housing 24 of system 22 is movable, such as when attached to a buoy. Nevertheless, it may be useful even when the housing 24 is fixed because, through its coupling to the communications device 16, it enables the location of the housing 24 as determined by the location determining system 30 to be included in transmissions from the communications device 16, as mentioned above, thereby providing an integral association between the detected sounds and their location in the transmissions.

System 22 could also be used to count passage of vehicles on a roadway for example or other similar counting functions.

Figure 4:
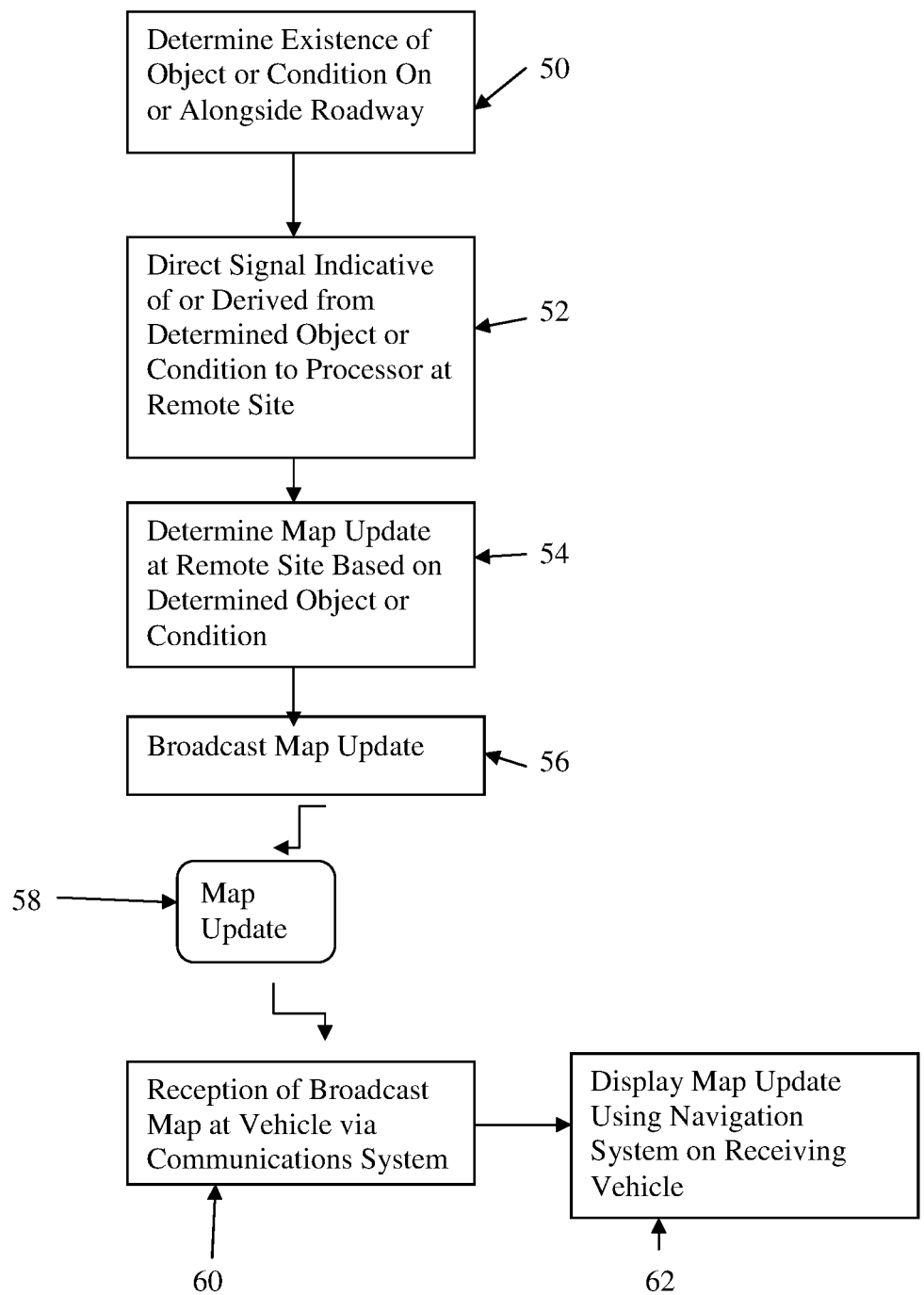
FIG. 4 is a schematic of an exemplifying manner in which a vehicle notification system in accordance with the invention operates.

FIG. 4 is a schematic of an exemplifying manner in which a vehicle notification system in accordance with the invention operates. In a first step 50, the existence of an object or condition on or alongside the roadway on which vehicles travel is determined, e.g., using a system and method disclosed in U.S. patent application Ser. No. 12/325,719 filed Dec. 1, 2008 or U.S. patent application Ser. No. 13/686,862 filed Nov. 27, 2012. The object or condition may be the presence of a large animal, such as a deer or bear, that may cause a severe accident with the vehicle traveling on the roadway. Then, a signal indicative of the determined object or condition is directed to the processor 44 at the remote site 18 in step 52.

In step 54, a map update 58 is determined at the remote site 18 based on the presence of the determined object or condition. This map update 58 may be determined by the processor 44 at the remote site 18. The map update 58 is then broadcast in step 56 under conditions and in accordance with industry specifications that enable reception of the map update 58 by vehicles that may travel on the roadway associated with the condition.

It is envisioned that there may be multiple vehicles with the object or condition existence reporting component of the system, all of which may transmit to the same remote site 18. The processor 44 at the remote site may be configured to coordinate multiple broadcasts, varied based on time, location or other parameters, to optimize the map update reception by vehicles based on relevance. That is, a vehicle may receive only those broadcasts that are relevant to its path from its current location to its destination and not other broadcasts. This may be determined from the known destination or travel path of the vehicle. The navigation system can receive multiple map updates and only react to those of relevance.

In step 60, the map updates 58 are received by the vehicles and in step 62, the vehicle-resident processor 14 or more likely, a processor associated with the navigation system of the vehicle, processes the map updates 58 and causes the display associated with the navigation system to display one or more of the received map update 58. In this manner, by processing of the received map updates 58, it becomes possible to place icons of animals or other movable objects, e.g., disabled vehicles, construction vehicles, lane blockages, etc., temporarily on a displayed map for warning and display to a vehicular occupant, e.g., on a heads-up display, or otherwise display travel conditions.

The map update is preferably designed to position the object or condition, e.g., an icon of a detected animal, on the display map at the precise location at which the animal is detected. This coordination may be easily effected by those skilled in the art to which this invention pertains in view of the disclosure herein or knowledge known to those skilled in the art to which this invention pertains. As used herein, an object or condition will generally include objects, such as an animal, a disabled vehicle, a vehicle traveling the wrong way, and conditions such as an accident, black ice, construction, police radar, a landslide, pot holes, rough road, smoke, low visibility, fog, snow, heavy rain, congestion, and the like. Objects may often also be and/or give rise to conditions, a disabled vehicle may cause smoke or oil on the roadway if the vehicle is on fire or leaking fuel, and conditions may result from the presence of one or more specific objects, e.g., congestion is due to many vehicles.

Figure 5:
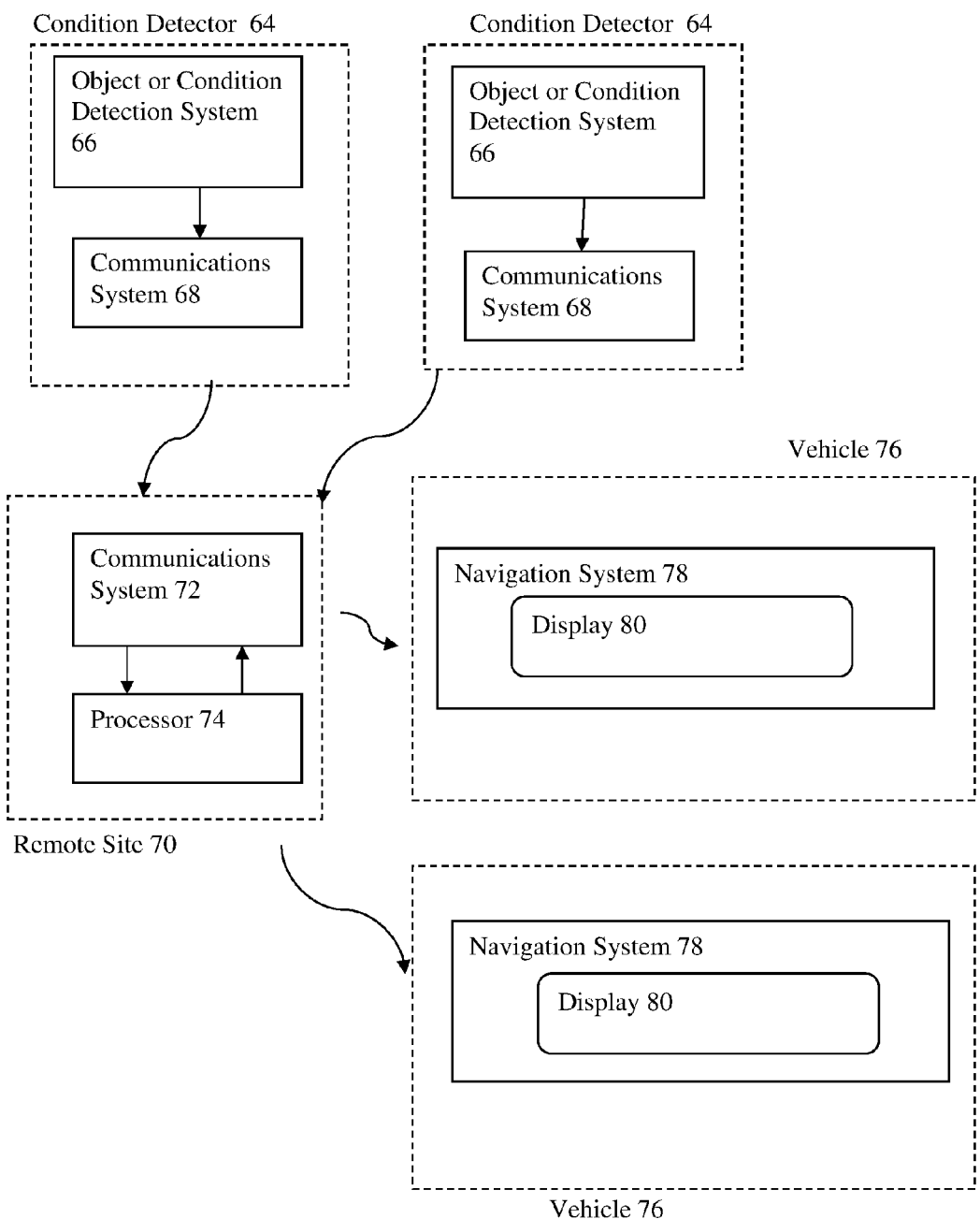
FIG. 5 shows structure that enables map updates derived from detected objects alongside a roadway to be disseminated from a remote site to vehicles in accordance with the invention.

FIG. 5 shows structure that enables map updates derived from detected objects or conditions alongside a roadway to be disseminated from a remote site to vehicles. Equivalent to map updates are messages for display on a map or other display in the vehicle, and will be considered to be encompassed by the term map updates as used herein. Such messages will generally be temporary in that they will be removed once the object or condition is no longer present at the location (FIG. 6 provides an explanation of how the map update or message is countermanded by issuance of another map update or message).

The structure includes one or more condition detector 64 placed in a position in which they can obtain data about potential hazardous conditions on or alongside a roadway, e.g., the presence of animals that can cause damage if a vehicle impacts them. Each condition detector 64 may include an object or condition detection system 66 as described above, or another comparable detection system, and a communications system 68 that transmits a signal whenever an object or condition of interest is detected by the detection system 66.

Each condition detector 64 may also include a location determining system (not shown), or if placed in a fixed location or in a fixed manner, provided with data about its fixed location, so that in both cases, location information about the condition detector 64 is provided with the transmission of the signal about the object or condition of interest from the condition detector 64. The condition detector 64 can be placed on vehicles in which case, the location of the condition detector 64 would be provided with transmissions containing information about objects or conditions of interest. The condition detector 64 can be fixed alongside roadways, e.g., in a pole, overhead gantry, direction sign, and the like, and a code identifying the condition detector 64 included in transmissions therefrom to enable association of the object or condition with a specific, pre-known location.

The transmission of the signals representative of objects or conditions of interest is to a remote site 70 for reception by a communications system 72. The signal is processed by a processor 74 coupled to the communications system 72. The processor 74 may perform similar functions as processor 44. It may receive raw data from the condition detectors 64 and process the raw data into a specific object or condition of interest. It may receive more specific data about a particular object or condition of interest and then determine a map update derived from the object or condition, and the location of the condition detector 64 providing the signal about the object or condition of interest, and transmission or broadcast parameters of the map updates. The map updates may then be sent to the communications system 72 to be transmitted and/or broadcast in accordance with the determined parameters, e.g., to vehicles 76 in the vicinity and/or heading towards the location at which the condition detector 64 is located.

Each vehicle 76 is equipped with a navigation system 78 having a display 80. The navigation system 78, or a processor thereof, is configured to process the map update and temporarily display an indication of the object or condition of interest. The map being display on the display 80 by the navigation system 78 is thus temporarily changed to reflect the presence of the object or condition of interest, e.g., a deer on the road at a specific location. This indication will allow the driver to exercise more caution at that location to avoid hitting the deer.

The navigation system 78 may also or alternatively have an audible warning system that generates a warning from the map update. That is, the map update may be in the form of an audio file that is designed to be spoken when the vehicle approaches the location of the object or condition of interest. One such audible message might be "deer detected in 500 feet". This, the display does not necessary have to be changed but a spoken alarm may instead be generated and convey the same information. The map updates may thus contain either an audio file and data about when to verbalize the content of the audio file, an image/text file containing an icon or data to cause display of an icon when a particular map segment is being displayed on display 80, or both. Other ways to convey information about an object or condition at a specific location using a navigation system are also considered to be within the scope of the invention.

Referring last to FIG. 6, the temporary nature of the displayed message or icon indicative of an object or condition on the map being displayed by the vehicular navigation system is enabled by the ability to have a vehicle, that passes by the location at which the object or condition is detected, confirm the continued presence of the object or ascertain lack of the object or condition at the expected location. The expected location is that location at which the object or condition was previously detected by another vehicle or by a fixed condition sensor.

To this end, a flowchart of the manner in which a processor would execute a software program to assess the presence of a previously reported object or condition that caused a map update to be sent to the vehicular navigation system and a corresponding icon or other indicia to be displayed or otherwise indicated to the operator of the vehicle, is depicted in FIG. 6. This flowchart may be considered an algorithm that allows for removal of an icon indicative of an object by communication of another map update causing removal of the icon, i.e., countermanding a previously received map update.

The first step 82 in this algorithm is for a vehicle to scan for the object or condition at the indicated location on the map. Although explained with reference to a vehicle, the same scanning may be performed by a condition sensor at a fixed location. That is, the condition sensor would operate periodically and may at one time, detect a condition resulting in communication of a map update to place an icon on a map display, and at a later time, detect that the object or condition is no longer present resulting in communication of a map update to remove the previously placed icon from the map display.

Since the condition detector that detects the object or condition may be different structurally than the system that determines whether an object or condition at a specific location is still present at that location or is no longer present (absent) at that location, the scanning may be performed by an assessment system. An assessment system is considered to include structure that obtains information about the location at which an object or condition was previously detected and can confirm the presence of this object or condition (as expected) or assess the absence of the object or condition.

Scanning for the object or condition by the vehicle may be effected by one or more cameras 8 on the vehicle (see FIG. 1). As such, the assessment system would constitute the cameras 8 and processing circuitry that can process the images to perform image analysis, ideally looking for an expected object or condition, and when the object or condition is lacking at the expected location, output a signal indicative of the absence of the object at that location. Other data gathering techniques to assess the continued presence or absence of the object or condition at the expected location may also be used, e.g., infrared, and ultrasonic, and others disclosed by the inventor in the patents incorporated by reference herein.

When cameras 8 are provided as the assessment system, they are coupled to the processor 14 and configured to obtain images including the location at which an object or condition was reported as being presented and analyze the images to determine whether that object or condition is still present. Such image analysis techniques are known to those skilled in the art to which this invention pertains. For example, a pattern recognition technique may be used to determine whether an image contains a bear or deer.

Additionally or alternatively, the scanning may be achieved by the sound-receiving/vibration-detecting components 12 that may be detect the same sounds/vibrations as detected to cause the map update to be sent or lack of such sounds/vibrations.

Processor 14 thus makes a decision 84 whether the object or condition is still detected at the reported location. If so, the processor 14 can either do nothing or transmit a communication via communications device 16 to the remote site 18 that indicates that the object or condition is still present at the location. This may be likely the situation when the object or condition is not able to move by itself, e.g., a boulder or dead deer.

Otherwise, if in step 84 the processor 14 determines that the object or condition is no longer present, it is configured to transmit a communication via communications device 16 to the remote site 18 that indicates that the object or condition is not present at the previously reported location, step 86. The processor at the remote site 18 (e.g., processor 74 as shown in FIG. 5 wherein remote site 70 may be the same as remote site 18), is then configured to cause updating of a map to reflect the lack of the object at the previously reported location and broadcast the map update. This broadcast, upon receipt by vehicular navigation system, will cause updating of the map to remove the object or condition (see 56-62 in FIG. 4).

The foregoing techniques can be used in a scenario wherein a vehicle travelling on a roadway passes a location and senses that a deer (or disabled vehicle, black ice, boulder) is present and places it on a map which become available to other vehicles in the area (e.g., in accordance with the algorithm shown in FIG. 4). Another vehicle that passes the same location and senses that the danger (object or condition) has been removed and no longer is threatening causes removal of the object or condition from the map (e.g., in accordance with the algorithm shown in FIG. 6 (steps 82, 84, 88, 90). Note that the same vehicle may at times, causes placement of an object or condition on a map and removal of either the same or other objects from the map, depending on the travel of the vehicle.

An important aspect of the invention is that it is possible to construct the system as a passive system that operates without knowledge of the vehicle operator. The system could function to obtain information about the environment around a vehicle, process the information to determine the presence or absence of previously reported objects or conditions using an on-board processor, and communication using an on-board communications device with the remote site to provide information to cause map updates to be generated. The system could also passively receive map updates and update the navigation system display and/or audio files based on received map updates.

Although described above are embodiments wherein objects are detected using sound or vibrations to cause communication of map updates, it is also possible to use other means to generate the information to be processed to cause the map updates to be communicated. For example, mentioned above is the use of cameras 8 to confirm the presence of previously reported objects. The same cameras 8 may be used to determine the presence of objects. As such, a condition detector 64 may be based on sound, vibration, optics and any other technique that can determine the presence of an object.

In one particular embodiment of the invention, the condition detectors 64 are situated on vehicles and configured to detect conditions that require reporting including a condition about whether a vehicle (the same or a different vehicle than the one on which the condition detector 64 is situated) has had an accident and/or disabled resulting in the vehicle being immovable or fixed at a specific location. Condition detectors 64 are thus able to detect the disabled vehicles and other objects, and cause issuance of map updates resulting in the temporary placement of such objects on a map of a navigation system. The map updates are thus almost instantly available to other vehicles as soon as one vehicle with a condition detector 64 detects the disabled vehicle or other object (in a manner described above). Then, when another vehicle with a condition detector 64, e.g., cameras 8, detects that the disabled vehicle or other object is no longer present at the previously detected location, it causes issuance of another map update resulting in the removal of that object on a map of a navigation system (see FIG. 8).

An advantage of this system over prior art systems is that the map update with the object of concern to drivers is automatically placed on the map update since the condition detectors 64, or cameras 8, function automatically to detect conditions that require issuance of a map update. Such conditions are mentioned above and include, but are not limited to, the presence of a large animal on the road, a disabled vehicle on the road, cargo that has fallen from a truck onto the road, black ice on the roadway, and a boulder on the road. Once an object is automatically detected, issuance of a map update does not require manual entry of data about the object. Similarly, once absence of a previously detected object is assessed, issuance of another map update to effect removal of the object from the map being displayed by the navigation system also does not require manual entry of data but is automatic as soon as the condition detector 64, or cameras 8, provides information indicative of the absence of the object.

Object or condition removal may be accomplished by the processor 74 at the remote site 70 comparing objects or conditions on and around the roadway at one time and at a later time. For example, this comparison may be effective to determine the presence of an object of interest or the satisfaction of a reporting condition, e.g., an accident involving one or more vehicles, since the road would have different objects on it.

The comparison may also be effective to determine when the accident has been cleared. The processor 74 may be configured to determine the reason why the roadway is different, e.g., by differential image analysis, and then analyze the differences to provide an indication of the event that caused the differences. An accident could thus be removed from the map, via the map update issuance, as a result of another vehicle passing by the accident site and providing information to the processor 74 at the remote site 70 that enables the processor 74 to determine that the accident, i.e., vehicles involved therein, is no longer present or no longer present on the roadway itself blocking traffic.

As an example, an image may be provided by the condition detector 64 on one vehicle with the processor 74 determining or confirming the presence of a disabled vehicle on the roadway. This will lead to issuance of a map update causing the disabled vehicle to appear on a map of a display of a navigation system. Then, an image may be provided by the condition detector 64 on another vehicle with the processor 74 determining or confirming the absence of that disabled vehicle on the roadway. This will lead to issuance of another map update causing the disabled vehicle to be removed from the map of the display of the navigation system. Thus, the entire disabled vehicle placement and removal is automatic and does not involve manual entry of information about the disabled vehicle.

The comparison, when relating to conditions of the roadway, may also be effective to remove an indication of black ice on the roadway.

The condition detectors 64 are positionable on vehicles or infrastructure. In this case, it is possible that a condition detector 64 on a vehicle may detect the presence of a disabled vehicle, but if no vehicles travel on that roadway, the absence of the vehicle may be detected by a condition detector 64 on infrastructure.

Accordingly, disclosed above is a processing arrangement for managing temporary updates to a map for use by vehicular navigation systems in a plurality of vehicles. The processing arrangement including a communications system at a remote site that is configured to receive wireless communications from each vehicle that includes information about presence of an object or condition at a specific location automatically identified at the specific location without requiring manual entry of data about the object or condition at the specific location. The presence of the object or condition at the specific location normally affects movement of vehicles on a roadway. A processor is coupled to the communications system and configured to generate an update for a map for use by the vehicular navigation systems based on the identified object or condition at the specific location included in the communications received by the communications system. The communications system is configured to transmit, upon direction, control or command by the processor, the generated map update to any vehicle in a vicinity of the specific location to cause the vehicular navigation system of that vehicle to use a map with the generated map update to display or otherwise indicate the presence of the object or condition at the specific location.

The processor is also preferably configured to process wireless communications received from each vehicle using the communications system including information that the object or condition whose presence was previously detected at the specific location is absent at the specific location at a subsequent time after generation of the map update relating to the presence of that object or condition at the specific location. In such cases, the processor generates another update for a map for use by the vehicular navigation systems based on the absence of the object or condition at the specific location provided during processing of the wireless communications received from each vehicle using the communications system, and directs transmission of the another map update using the communications system to any vehicle in a vicinity of the specific location. This causes the vehicular navigation system of the vehicles to use a map with the another map update to avoid display or indication of the presence of the object or condition at the specific location.

The map update or another map update may be an audio file that is configured to be verbalized by the vehicular navigation system when a location of the vehicle including the vehicular navigation system approaches the specific location, and/or an image file that is configured to be displayed on a display of the vehicular navigation system at the specific location. The processor may generate as the map update, a vehicle-targeted map update and wirelessly transmit the vehicle-targeted map update using the communications system from the remote site to vehicles travelling on a roadway based on the specific location.

Finally, all of the techniques disclosed in the above-mentioned patents may be incorporated together with one another and/or with the techniques first disclosed herein and all such combinations are considered by the inventor to be his invention.

As used herein, a roadway is typically a road on which a land vehicle travels. The land vehicle is not necessarily a car, truck or bus, which are often generally considered as land vehicles. Rather, the roadway may be any surface on which vehicles travel in accordance with an understood convention, including for examples, travel lanes, taxiways and runways for airplanes. For use with planes, the invention would be able to notify pilots of hazards on or around the runways, such as geese flying near a runway or turtles moving along a runway.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A processing arrangement for managing temporary updates to a map for use by vehicular navigation systems in a plurality of vehicles, comprising:
   a communications system at a remote site that is configured to receive wireless communications from each of the vehicles that includes information about presence of an object or condition at a specific location automatically identified at the specific location without requiring manual entry of data about the object or condition at the specific location, the presence of the object or condition at the specific location affecting movement of vehicles on a roadway; and
   a processor coupled to said communications system and configured to generate an update for a map for use by the vehicular navigation systems based on the identified object or condition at the specific location included in the communications received by said communications system;
   said communications system being configured to transmit the generated map update to any vehicle in a vicinity of the specific location to cause the vehicular navigation system of that vehicle to use a map with the generated map update to display or otherwise indicate the presence of the object or condition at the specific location,
   said processor being further configured to:
      process wireless communications received from each of the vehicles using said communications system including information that the object or condition whose presence was previously detected at the specific location is absent at the specific location at a subsequent time after generation of the map update relating to the presence of that object or condition at the specific location,
      generate another update for a map for use by the vehicular navigation systems based on the absence of the object or condition at the specific location provided during processing of the wireless communications received from each of the vehicles using said communications system; and
      direct transmission of the another map update using said communications system to any vehicle in a vicinity of the specific location to cause the vehicular navigation system of the vehicles to use a map with the another map update to avoid display or indication of the presence of the object or condition at the specific location.

2. The processing arrangement of claim 1, wherein the map update comprises an audio file that is configured to be verbalized by the vehicular navigation system when a location of the vehicle including the vehicular navigation system approaches the specific location.

3. The processing arrangement of claim 1, wherein the map update comprises an image file that is configured to be displayed on a display of the vehicular navigation system at the specific location.

4. The processing arrangement of claim 1, wherein said processor is further configured to generate as the map update, a vehicle-targeted map update and wirelessly transmit the vehicle-targeted map update using said communications system from the remote site to vehicles travelling on a roadway based on the specific location.

5. A multi-vehicle method for causing temporary updates to a map for use by a vehicular navigation system in each vehicle, comprising:
   identifying presence of an object or condition at a specific location and for which presence of the object or condition at the specific location affects movement of vehicles on a roadway using at least one condition detector located on at least one of the vehicles or infrastructure, the at least one condition detector being configured to identify the presence of the object or condition at the specific location without requiring manual entry of data about the object or condition at the specific location;
   when the presence of an object or condition is identified by the at least one condition detector, wirelessly communicating the presence of the object or condition at the specific location automatically identified by the at least one condition detector to a remote site using a first communications system coupled to the at least one condition detector;
   generating, using a processor at the remote site, an update for a map for use by the vehicular navigation systems based on the identified object or condition at the specific location;
   transmitting, using a second communications system associated with the remote site, the generated map update to any vehicle in a vicinity of the specific location at which the at least one condition detector detected the presence of the object or condition to cause the vehicular navigation system of that vehicle to use a map with the generated map update to display or otherwise indicate the presence of the object or condition at the specific location;
   determining whether the object or condition whose presence was detected by the at least one condition detector at the specific location is still present at that location or is absent at the specific location at a subsequent time after generation of the map update relating to the presence of that object or condition using an assessment system in any of the vehicles passing by that location or infrastructure capable of obtaining information about that location, and
   when the assessment system determines that the object or condition is absent at the specific location,
      communicating the absence of the object or condition at the specific location to the remote site using a third communications system;
      generating, using the processor at the remote site, another update for the map for use by the vehicular navigation systems based on the absence of the object or condition at the specific location;
      transmitting, using the second communications system associated with the remote site, the another update to vehicles in that vicinity to cause the vehicular navigation system of the vehicles to use a map with the another map update to avoid display or indication of the presence of the object or condition at the specific location.

6. The method of claim 5, wherein the step of generating the map update comprises generating an audio file that is configured to be verbalized by vehicular navigation system when a location of the at least one vehicle approaches the specific location.

7. The method of claim 6, wherein the step of identifying presence of an object or condition at a specific location and for which presence of the object or condition at the specific location affects movement of vehicles on a roadway using at least one condition detector located on at least one of the vehicles or infrastructure comprises identifying presence of an object or condition selected from a group consisting of an animal, an accident, a disabled vehicle, ice, construction, police radar, a landslide, pot holes, rough road, a vehicle traveling the wrong way on the roadway, smoke, low visibility, fog, snow, heavy rain and congestion.

8. The method of claim 5, wherein the step of generating the map update comprises generating an image file that is configured to be displayed on a display of the vehicular navigation system at the specific location.

9. The method of claim 5, wherein the at least one condition detector is arranged at a fixed location on or alongside the roadway such that the at least one condition detector detects objects or conditions on or alongside the roadway.

10. The method of claim 9, wherein the step of transmitting the map update to any vehicle comprising directing a vehicle-targeted map update from the remote site to vehicles travelling on the roadway based on location of the at least one condition detector at which the presence of the object or condition is detected.

11. The method of claim 5, wherein the at least one condition detector is located on one of the vehicles.

12. The method of claim 11, wherein the step of wirelessly communicating the presence of the object or condition at the specific location automatically identified by the at least one condition detector to a remote site using a first communications system coupled to the at least one condition detector comprises wirelessly transmitting a signal, data or information about the presence of the object or condition at the specific location automatically detected by the at least one condition detector, the first communications system being situated on the same vehicle as the at least one condition detector.

13. The method of claim 11, wherein the first communications system is co-located with the at least one condition detector on the vehicle.

14. The method of claim 5, wherein the at least one condition detector is located on infrastructure.

15. The method of claim 5, wherein the step of communicating the absence of the object or condition at the specific location to the remote site using a third communications system comprises wirelessly transmitting a signal, data or information about the determined absence of the object or condition at the specific location to the remote site using the third communications system.

16. The method of claim 15, wherein the assessment system is coupled to the first communications system and the signal, data or information about the determined absence of the object or condition at the specific location is transmitted by the first communications system to the second communications system.

17. The method of claim 5, wherein the first communications system is arranged in a common housing on the vehicle with the at least one condition detector.

18. The method of claim 5, wherein the at least one condition detector is removably coupled to the vehicle and receives sounds from an environment in or around the vehicle.

19. The method of claim 5, wherein the at least one condition detector is removably coupled to the vehicle and receives vibrations from an environment in or around the vehicle.

20. The method of claim 5, wherein the at least one condition detector is independently operable when separated and removed from the vehicle.

* * * * *